(12) United States Patent
Chen et al.

(10) Patent No.: US 11,815,474 B2
(45) Date of Patent: Nov. 14, 2023

(54) METHOD FOR ACCURATELY CHARACTERIZING CRYSTAL THREE-DIMENSIONAL ORIENTATION AND CRYSTALLOGRAPHIC ORIENTATION

(71) Applicant: DALIAN UNIVERSITY OF TECHNOLOGY, Liaoning (CN)

(72) Inventors: Guoqing Chen, Liaoning (CN); Yakun Wang, Liaoning (CN); Xuesong Fu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 380 days.

(21) Appl. No.: 17/310,067

(22) PCT Filed: Jan. 20, 2020

(86) PCT No.: PCT/CN2020/073163
§ 371 (c)(1),
(2) Date: Jul. 14, 2021

(87) PCT Pub. No.: WO2021/027264
PCT Pub. Date: Feb. 18, 2021

(65) Prior Publication Data
US 2022/0065801 A1 Mar. 3, 2022

(30) Foreign Application Priority Data
Aug. 9, 2019 (CN) .......................... 201910736340.3

(51) Int. Cl.
*G01N 23/203* (2006.01)
*G01N 23/046* (2018.01)
*G01N 23/2251* (2018.01)

(52) U.S. Cl.
CPC ......... *G01N 23/203* (2013.01); *G01N 23/046* (2013.01); *G01N 23/2251* (2013.01); *G01N 2223/418* (2013.01); *G01N 2223/602* (2013.01)

(58) Field of Classification Search
CPC .............. G01N 23/203; G01N 23/046; G01N 23/2251; G01N 2223/418; G01N 2223/602
See application file for complete search history.

(56) References Cited

U.S. PATENT DOCUMENTS

2018/0080884 A1 3/2018 Li et al.

FOREIGN PATENT DOCUMENTS

CN 102103093 A 6/2011
CN 103928363 A 7/2014
(Continued)

*Primary Examiner* — David P Porta
*Assistant Examiner* — Fani Polyzos Boosalis
(74) *Attorney, Agent, or Firm* — NKL Law; Allen Xue

(57) ABSTRACT

A method for accurately characterizing a crystal three-dimensional orientation and a crystallographic orientation, including the following steps: acquiring a two-dimensional structure topography and an EBSD pattern in an area to-be-detected of a crystal material; using three-dimensional image analysis software to perform three-dimensional image synthesis through so as to obtain a three-dimensional topography; extracting a three-dimensional orientation of a characteristic topography in a coordinate system where the three-dimensional topography is located; and by converting the three-dimensional orientation into a crystallographic coordinate system obtained by EBSD, obtaining the crystallographic orientation of the characteristic topography. By using the method, the orientation of characteristic organization structures of various materials and the crystallographic orientation may be simultaneously analyzed, which has a (Continued)

great significance for research on the material crystal growth orientation and growth behavior.

4 Claims, 3 Drawing Sheets

(56) References Cited

FOREIGN PATENT DOCUMENTS

| | | | |
|---|---|---|---|
| CN | 104470681 A | 3/2015 | |
| CN | 105739232 A | 7/2016 | |
| CN | 107607744 A | 1/2018 | |
| CN | 108226198 A | 6/2018 | |
| CN | 110441342 A | 11/2019 | |
| JP | 4249954 B2 * | 4/2009 | ......... G01N 23/2251 |

* cited by examiner

METHOD FOR ACCURATELY CHARACTERIZING CRYSTAL THREE-DIMENSIONAL ORIENTATION AND CRYSTALLOGRAPHIC ORIENTATION

TECHNICAL FIELD

The present disclosure relates to the technical field of material analysis, and more particularly, to a method for accurately characterizing a crystal three-dimensional orientation and a crystallographic orientation.

BACKGROUND

In order to obtain the microstructure of materials in three-dimensional space, there are two methods commonly used at present.

The first method is to conduct a three-dimensional observation on materials by using computed tomography (CT). The common light source is synchrotron radiation X-ray source, neutron ray source, etc. Chinese patent application CN201610118509.5 discloses a real-time X-ray stereoscopic imaging system and imaging method based on synchrotron radiation. The method reconstructs the sample by a two-dimensional projection of the sample in different directions, and combines absorption contrast or phase contrast imaging technology to realize the three-dimensional accurate reconstruction of the sample structure. The main problem of the method is that the requirement of light source is very high, the operation is complex, and the three-dimensional orientation information of the crystal structure of the sample cannot be obtained at the same time.

The second method is to obtain the two-dimensional cross section structure of each layer by chromatography and conduct topography observation, and then obtain the spatial structure topography after a three-dimensional reconstruction. Chinese patent application CN201380024943.1 discloses a device for observing and photographing, which is mainly based on a microscope having a photographing unit used to photograph a magnified sample. The sample can be ground mechanically and imaged with a light mirror. The main problems of this method are large workload and difficult alignment between layers.

Focused ion beam/scanning electron microscopy (FIB/SEM) system has the capabilities of focused ion beam micro nano processing and scanning electron microscopy observation and analysis. In the FIB/SEM dual-beam system, the scanning electron microscopy is used to observe and seek for the characteristic area (such as defect, interface, etc.) of the sample, and then the area is accurately processed by focused ion beam. The FIB/SEM dual-beam system can also obtain the information about the chemical composition and crystal structure of the sample. Chinese patent application CN201710772302.4 discloses a three-dimensional characterization method for the surface coating of a galvanized sheet. The three-dimensional characterization method adopts the ion beam in the FIB/SEM dual-beam system to cut the galvanized sheet coating, the electron beam to collect the relevant data of the cutting cross section, and combines with the three-dimensional image analysis software to analyze the coating information, which has the advantages of high accuracy and simultaneous orientation analysis. Therefore, the FIB/SEM dual-beam system plays an important role in material failure analysis, structure characterization and performance analysis of nanomaterials, and development of nano devices, etc. The present disclosure is a deep development and efficient utilization of FIB technology.

SUMMARY OF THE INVENTION

According to the technical problems mentioned above, the present disclosure provides a method for accurately characterizing a crystal three-dimensional orientation and a crystallographic orientation. The technical solutions adopted by the present disclosure are as follows:

A method for accurately characterizing a crystal three-dimensional orientation and a crystallographic orientation, including the following steps:

S1. acquiring two-dimensional structure topographies of a series of cross sections in an area to-be-detected of a crystal material;

S2. acquiring an EBSD (Electron Back Scatter Diffraction) pattern in the area to-be-detected;

S3. using a three-dimensional image analysis software to perform three-dimensional image synthesis on the series of the two-dimensional structure topography acquired in step S1, to acquire a three-dimensional topography;

S4. establishing a conversion relationship between a crystallographic coordinate system acquired by EBSD and a coordinate system of the three-dimensional topography;

S5. extracting a three-dimensional orientation of a characteristic topography in the coordinate system from the three-dimensional topography synthesized in step S3; and S6. converting the three-dimensional orientation of the characteristic topography in step S5 into the crystallographic coordinate system acquired by EBSD, to obtain the crystallographic orientation of the characteristic topography.

Further, the two-dimensional structure topography can be obtained by observing through FIB/SEM dual-beam system, or by observing through an optical microscope after mechanical polishing.

Further, the EBSD pattern is obtained by analyzing EBSD data of at least one plane in an area, and the EBSD data is collected based on an EBSD probe.

Further, the characteristic topography can determine the three-dimensional orientation of a characteristic plane through a slicing function in the three-dimensional image analysis software; and for a characteristic line or rod, obtaining the three-dimensional orientation of the characteristic line or rod by extracting normal directions of the two planes passing through the line or rod and carrying out a multiplication cross of the normal directions.

The present disclosure extracts the three-dimensional orientation of the characteristic topography of the reconstructed sample, to obtain the spatial crystallographic orientation through a coordinate transformation, which can accurately and simultaneously analyze the orientation and crystallographic orientation of the characteristic structure of the eutectic ceramic material, especially has a strong applicability for the characteristic structure of micron size. The present disclosure is also applicable to the microstructure analysis of pure metals, alloys, metal matrix composites, inorganic nonmetallic materials and other materials, which has a great significance for research on the material crystal growth orientation and growth behavior. The present disclosure characterize the characteristic structure by combining SEM image and EBSD image, and has a higher resolution for the direction and topography of the characteristic structure than that of the simple 3D-EBSD.

Based on the above reasons, the present disclosure can be widely popularized in the field of material analysis technology.

DETAILED DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and those ordinary skilled in the art may still derive other accompanying drawings from these accompanying drawings without creative efforts.

DETAILED DESCRIPTION OF PREFERRED EMBODIMENTS

Figure 1:
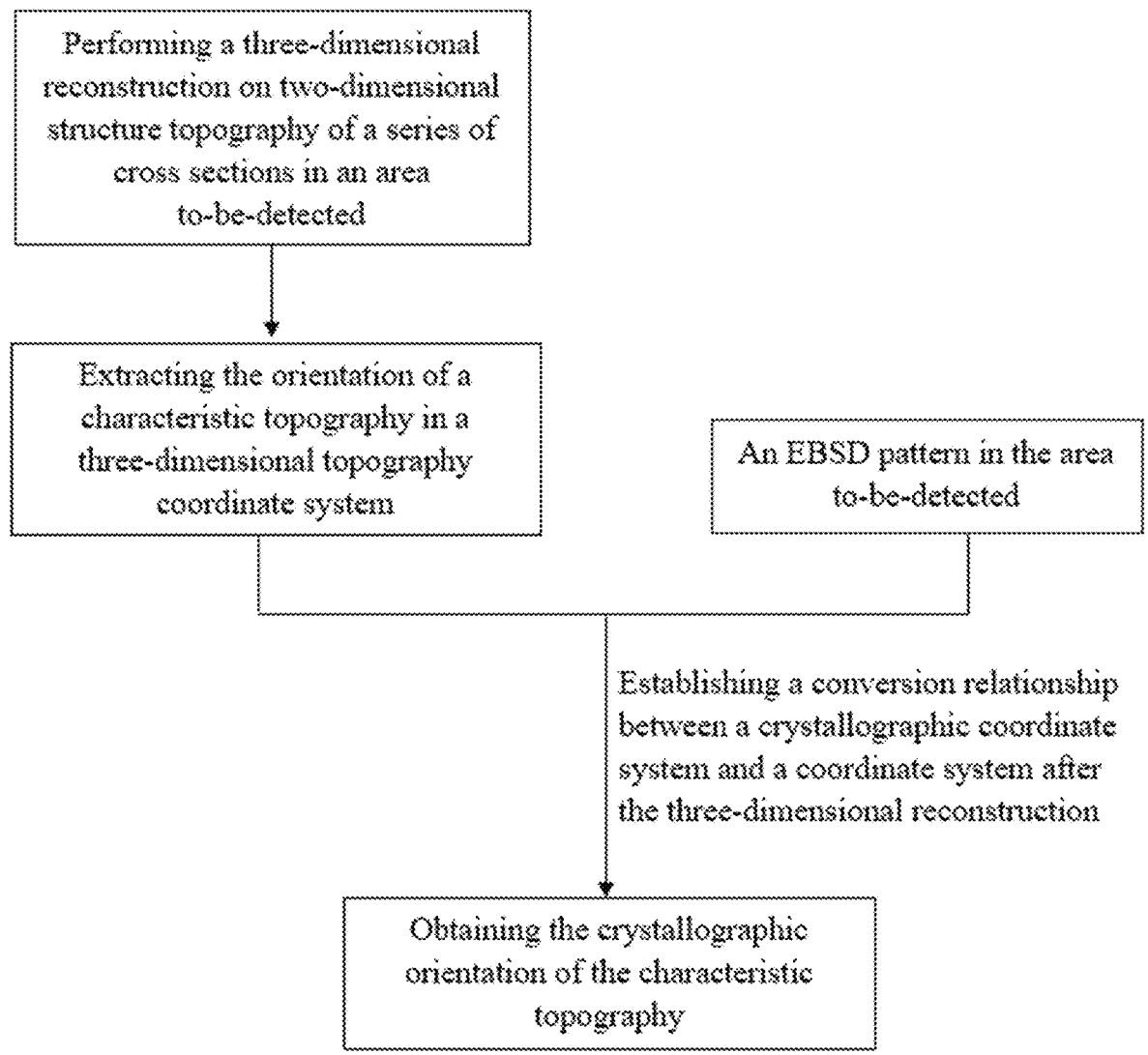
FIG. 1 is a flow diagram of the operation steps of the present disclosure.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present disclosure and its application or use. Based on the embodiments of the present disclosure, all the other embodiments obtained by those ordinary skilled in the art without inventive effort are within the protection scope of the present disclosure.

The present disclosure discloses a method for accurately characterizing a crystal three-dimensional orientation and a crystallographic orientation, including the following steps:

S1. The crystal to-be-analyzed is pretreated, that is, according to the measurement requirements of different crystals to perform treatment such as pre-grinding, polishing, etc., and then is placed in the experimental area, and the two-dimensional structure topographies of a series of cross sections in the area to-be-detected of the crystal material are obtained by the FIB/SEM dual-beam system or by an optical microscope observation.

S2. At the same time, the EBSD pattern in the area to-be-detected is obtained by the EBSD data system which includes an EBSD probe, a control system and a corresponding processing software. The probe transmits the collected EBSD pattern to a computer software for calibration, and the EBSD crystallographic coordinate system is constructed by the vectors in the macro coordinate system correspond to the diffraction pattern obtained through the Channel 5 software.

S3. The series of two-dimensional structure topographies obtained in step S1 are synthesized by a three-dimensional image analysis software to obtain the three-dimensional topography. The three-dimensional image analysis software in the embodiment uses Avizo software, to process the SEM image imported into Avizo software, then threshold segmentation is conducted to perform binarization processing on the overall data, and the coordinate system where the three-dimensional topography is located is automatically generated by Avizo software.

S4. A conversion relationship is established between the crystallographic coordinate system obtained in step S2 and the coordinate system of the three-dimensional topography obtained in step S3. Specifically, artificial conversion is carried out according to different collected EBSD planes. In the embodiment, the relation between the basis vector directions of X, Y, and Z defined in Avizo and the basis vector directions of x, y, and z in EBSD image is X=x; Y=1*y; Z=z.

S5. The three-dimensional orientation of the characteristic topography in the coordinate system where the three-dimensional topography is located is extracted from the three-dimensional topography synthesized in the step S3. Different characteristic topographies are extracted according to the rod or plane structures of different crystals. The central axis of the rod is mainly extracted when the characteristic topography of the rod is extracted, and the normal orientation of the plane is extracted when the characteristic structure of the plane is extracted. Two face normals through a rod are obtained by using the Slice command of Avizo, and the direction of the center line of the rod is obtained by cross-multiplying the two face normals. The face normal of the characteristic plane is obtained by using the Slice command of Avizo, and the face normal direction of the plane is the face normal direction of the characteristic plane.

S6. The three-dimensional orientation of the characteristic topography in step S5 is converted to the crystallographic coordinate system obtained by EBSD, so as to obtain the crystallographic orientation of the characteristic topography.

EMBODIMENT 1

1. Firstly, the to-be-analyzed $Al_2O_3/ZrO_2$ eutectic ceramic is pre-ground, polished and sprayed with carbon.

Figure 2:
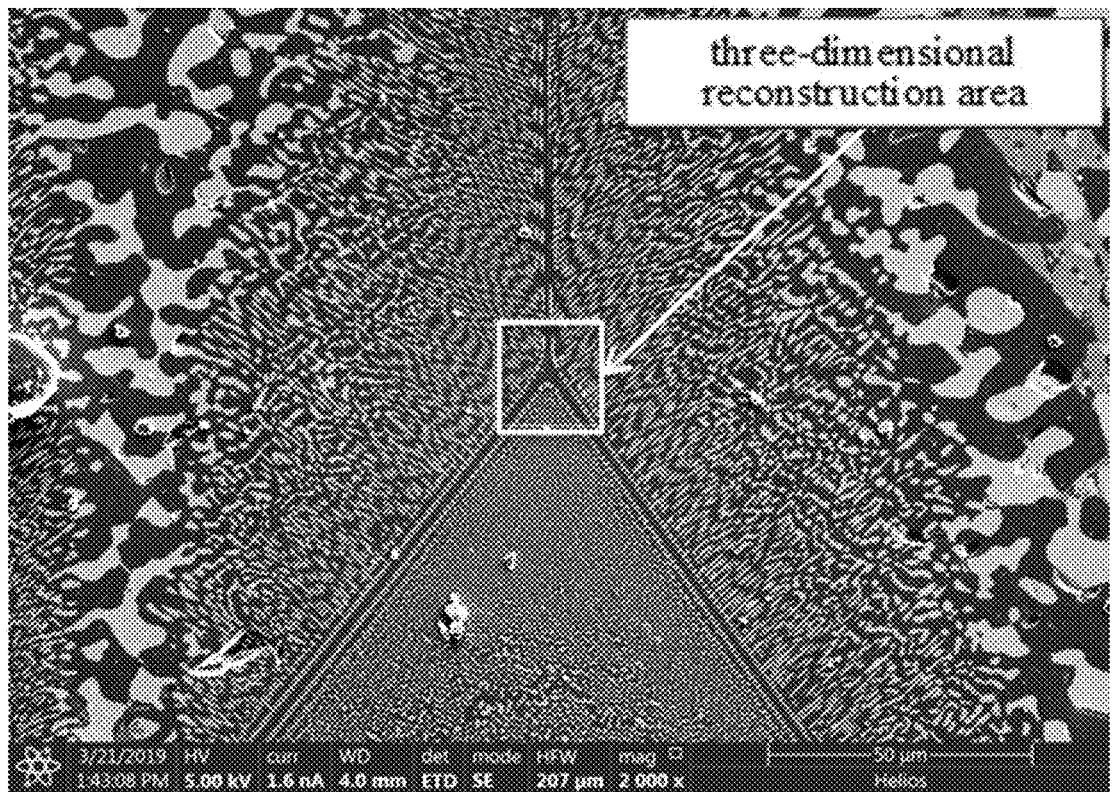
FIG. 2 is an SEM picture of the area of interest in $Al_2O_3/ZrO_2$ eutectic ceramic in Embodiment 1 of the present disclosure.

2. The FIB/SEM dual-beam system (Helios G4 UX, FEI) is used to combine the EBSD (Electron Backscattered Diffraction) probe (Oxford) to conduct a three-dimensional reconstruction and a three-dimensional EBSD characterization. The appropriate characterization area is observed by backscattered electron images. The three-dimensional reconstruction area is shown in FIG. 2. The size of the three-dimensional reconstruction area is 20*10*10 $\mu m^3$ and a depth direction is 10 µm. After selecting the area, the surrounding area is dug and the area to-be-three-dimensional-reconstructed is weld to a copper ring. Then a program is set to perform ion beam cutting, and the data are collected by the electron beam and EBSD probe used in SEM imaging. One SEM image is collected every 100 nm, and one EBSD image is collected every 200 nm.

Figure 3:
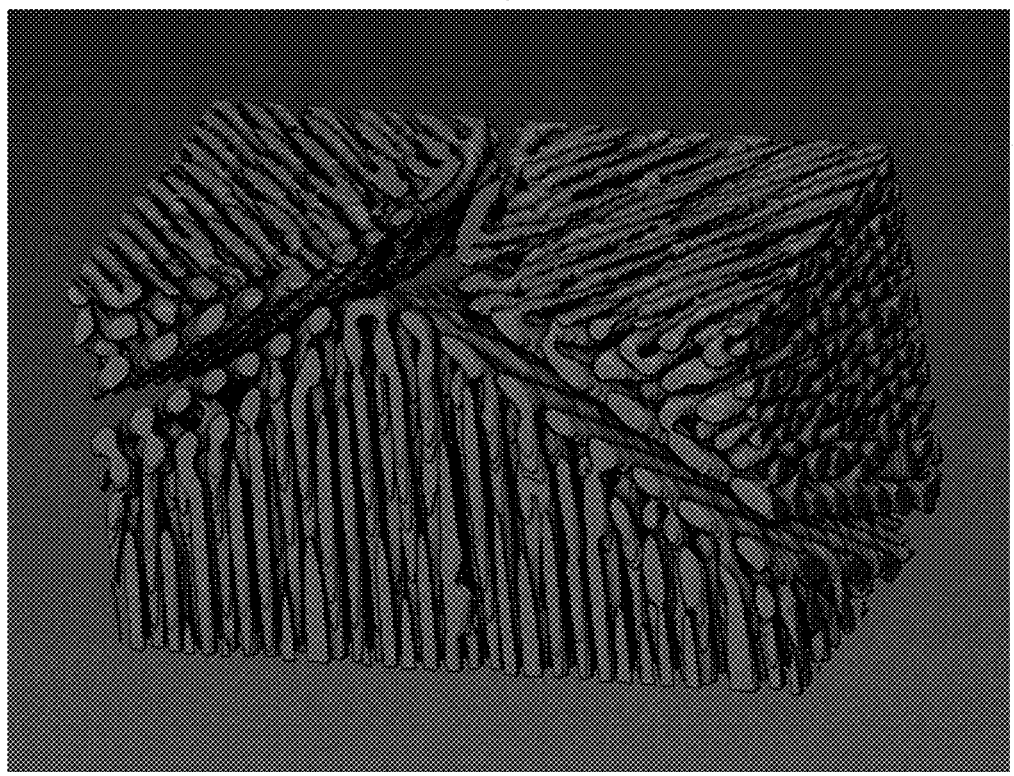
FIG. 3 is a three-dimensional image of $Al_2O_3/ZrO_2$ eutectic ceramic after a three-dimensional reconstruction in Embodiment 1 of the present disclosure.
Figure 4:
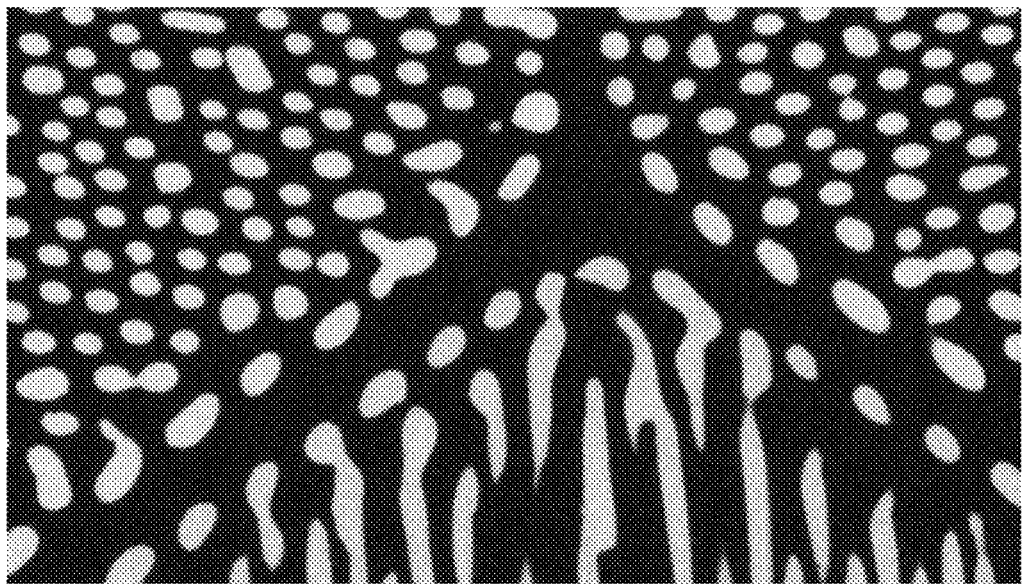
FIG. 4 is a single slice diagram in Embodiment 1 of the present disclosure.

3. The collected SEM images are imported into Avizo, and the thickness of the slice is set as 100 nm. Then the steps in DualBeam 3D Wizard are followed to process. The SEM images collected in this embodiment have no distortion, so correction is not required. The following steps are respectively performed in sequence: image cutting, deleting the problematic slices, alignment processing, and then cutting the image again to finally determine the area of interest, filtering, noise reduction, and brightness correction (the two steps of noise reduction and brightness correction are skipped in this embodiment). After completing the steps, threshold segmentation is conducted to perform binarization processing on the overall data. The gray level range corresponding to $ZrO_2$ is uniformly defined as 1, and that of $Al_2O_3$ is uniformly defined as 0. The structure topography of three-dimensional display of the selected $ZrO_2$ phase area is shown in FIG. 3. The three basis vector directions of X, Y and Z (Left-hand rule) are defined in Avizo, and observed on the slice, which is shown in FIG. 4. After normalization, X, Y and Z are the basis vectors of the three-dimensional image constructed by the SEM image respectively.

Figure 5:
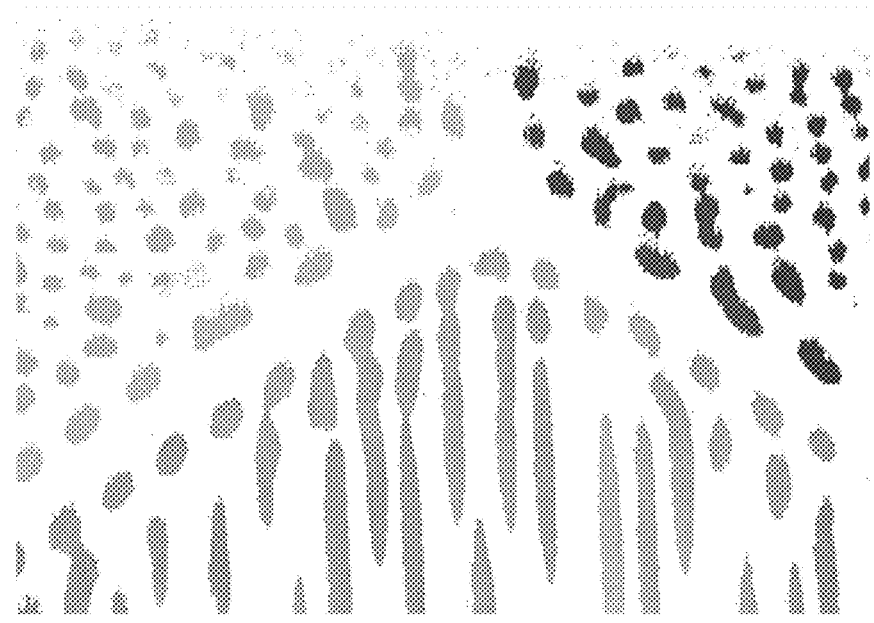
FIG. 5 is an inverse pole figure of a single slice EBSD in Embodiment 1 of the present disclosure.

4. The orientation information obtained by 3D-EBSD shows that $Al_2O_3$ ceramic in this area is a single crystal, and the orientations in different slice photos are consistent. Therefore, in this embodiment, the EBSD image of the first slice is used to obtain the crystallographic orientation of the sample. The inverse pole figure (IPF) of the first slice is shown in FIG. 5. Since the EBSD image is not corrected with 70 degree during collecting, it needs to be elongated in the vertical direction, and the length after elongation is 2.94 times the original length. The RD, TD and ND directions of the collected EBSD data correspond to the x, y and z basis vector directions of the EBSD image respectively, and the x, y and z basis vectors are obtained after normalization.

The geometric relationship in the experiment shows that the relationship between the X, Y and Z basis vector directions defined in Avizo and the x, y and z basis vector directions in EBSD image is:

$$X=x;\ Y=-1*y;\ Z=z.$$

5. The structure topography of $ZrO_2$ ceramic in this embodiment is mainly a rod-shaped structure, and has planes composed of rods. Therefore, this embodiment takes one rod and one plane as examples to extract the characteristic structure. The central axis of the rod is mainly extracted when the characteristic topography of the rod is extracted, and the normal orientation of the plane is extracted when the characteristic structure of the plane is extracted. The Slice command of Avizo is used to obtain two face normals passing through a rod, and the center line direction of the rod is obtained by cross-multiplying the two face normals of two planes. The Slice command of Avizo is used to obtain the face normal of the characteristic plane, and the face normal direction of the plane is the face normal direction of the characteristic plane. The orientation of the characteristic orientation in the crystallographic coordinate system can be obtained by the conversion of X, Y, Z and x, y, z.

EMBODIMENT 2

1. Firstly, the casting polycrystalline silicon to-be-analyzed is pre-ground and polished.

2. The FIB/SEM dual-beam system (Helios G4 UX, FEI) is used to combine the EBSD probe (Oxford) to conduct a three-dimensional reconstruction and a three-dimensional EBSD characterization. The appropriate characterization area is observed by secondary electron images. The size of the three-dimensional reconstruction area is 20*10*10 µm³ and a depth direction is 10 µm. After selecting the area, the surrounding area is dug and the area to-be-three-dimensional-reconstructed is weld to a copper ring. Then a program is set to perform ion beam cutting, and the data are collected by electron beam and EBSD probe. One SEM image is collected every 100 nm, and one EBSD image is collected every 200 nm.

3. The collected SEM images are imported into Avizo, and the thickness of the slice is set as 100 nm. Then the steps in DualBeam 3D Wizard are followed to process. The SEM images collected in this embodiment have no distortion, so correction is not required. The following steps are respectively performed in sequence: image cutting, deleting the problematic slices, alignment processing, and then cutting the image again to finally determine the area of interest, filtering, noise reduction, and brightness correction (the two steps of noise reduction and brightness correction are skipped in this embodiment). After completing the steps, threshold segmentation is conducted to perform binarization processing on the overall data. The gray level range corresponding to the Si crystal grain on one side is uniformly defined as 1, and that of Si crystal grain on the other side is uniformly defined as 0. The selected side of Si crystal grain area is displayed in three dimensions. The three basis vector directions of X, Y and Z (Left-hand rule) are defined in Avizo. After normalization, X, Y and Z are the basis vectors of the three-dimensional image constructed by the SEM image respectively.

4. The orientation information obtained by 3D-EBSD is used to determine the Si orientations in different areas. Since the EBSD image is not corrected with 70 degree during collecting, it needs to be elongated in the vertical direction, and the length after elongation is 2.94 times the original length. The RD, TD and ND directions of the collected EBSD data correspond to the x, y and z basis vector directions of the EBSD image respectively, and the x, y and z basis vectors are obtained after normalization.

The geometric relationship in the experiment shows that the relationship between the X, Y and Z basis vector directions defined in Avizo and the x, y and z basis vector directions in EBSD image is:

$$X=x;\ Y=-1*y;\ Z=z.$$

5. The characteristic structure of the Si crystal gain in the embodiment is extracted. The normal orientation of a plane is extracted when the characteristic structure of the plane is extracted. The Slice command of Avizo is used to obtain two face normals passing through a rod, and the center line direction of the rod is obtained by cross-multiplying the two face normals of two planes. The Slice command of Avizo is used to obtain the face normal of the characteristic plane, and the face normal direction of the plane is the face normal direction of the characteristic plane. The orientation of the characteristic orientation in the crystallographic coordinate system can be obtained by the conversion of X, Y, Z and x, y, z.

EMBODIMENT 3

1. Firstly, the Ai-Si eutectic alloy to-be-analyzed is pre-ground and polished.

2. The FIB/SEM dual-beam system (Helios G4 UX, FEI) is used to combine the EBSD probe (Oxford) to conduct a three-dimensional reconstruction and a three-dimensional EBSD characterization. The appropriate characterization area is observed by backscattered electron images. The size of the three-dimensional reconstruction area is 20*10*10 µm³ and a depth direction is 10 µm. After selecting the area, the surrounding area is dug and the area to-be-three-dimensional-reconstructed is weld to a copper ring. Then a program is set to perform ion beam cutting, and the data are collected by electron beam and EBSD probe. One SEM image is collected every 100 nm, and one EBSD image is collected every 200 nm.

3. The collected SEM images are imported into Avizo, and the thickness of the slice is set as 100 nm. Then the steps in DualBeam 3D Wizard are followed to process. The SEM images collected in this embodiment have no distortion, so correction is not required. The following steps are respectively performed in sequence: image cutting, deleting the problematic slices, alignment processing, and then cutting the image again to finally determine the area of interest, filtering, noise reduction, and brightness correction (the two steps of noise reduction and brightness correction are skipped in this embodiment). After completing the steps, threshold segmentation is conducted to perform binarization processing on the overall data. The gray level range corresponding to the primary Si phase is uniformly defined as 1, and that of the matrix phase is uniformly defined as 0. The selected primary Si phase area is displayed in three dimensions. The three basis vector directions of X, Y and Z (Left-hand rule) are defined in Avizo. After normalization, X, Y and Z are the basis vectors of the three-dimensional image constructed by the SEM image respectively.

4. The orientation information obtained by 3D-EBSD is used to determine the matrix orientations in different areas. Since the EBSD image is not corrected with 70 degree during collecting, it needs to be elongated in the vertical direction, and the length after elongation is 2.94 times the original length. The RD, TD and ND directions of the collected EBSD data correspond to the x, y and z basis vector directions of the EBSD image respectively, and the x, y and z basis vectors are obtained after normalization.

The geometric relationship in the experiment shows that the relationship between the X, Y and Z basis vector directions defined in Avizo and the x, y and z basis vector directions in EBSD image is:

$X=x; Y=-1*y; Z=z.$

5. The characteristic structure of the single crystal Si phase in the embodiment is extracted. The normal orientation of a plane is extracted when the characteristic structure of the plane is extracted. The Slice command of Avizo is used to obtain two face normals passing through a rod, and the center line direction of the rod is obtained by cross-multiplying the two face normals of two planes. The Slice command of Avizo is used to obtain the face normal of the characteristic plane, and the face normal direction of the plane is the face normal direction of the characteristic plane. The orientation of the characteristic orientation in the crystallographic coordinate system can be obtained by the conversion of X, Y, Z and x, y, z.

EMBODIMENT 4

1. Firstly, the 718 nickel base alloy to-be-analyzed is pre-ground and polished.

2. The FIB/SEM dual-beam system (Helios G4 UX, FEI) is used to combine the EBSD probe (Oxford) to conduct a three-dimensional reconstruction and a three-dimensional EBSD characterization. The appropriate characterization area is observed by backscattered electron images. The size of the three-dimensional reconstruction area is 20*10*10 $\mu m^3$ and a depth direction is 10 μm. After selecting the area, the surrounding area is dug and the area to-be-three-dimensional reconstructed is weld to a copper ring. Then a program is set to perform ion beam cutting, and the data are collected by electron beam and EBSD probe. One SEM image is collected every 100 nm, and one EBSD image is collected every 200 nm.

3. The collected SEM images are imported into Avizo, and the thickness of the slice is set as 100 nm. Then the steps in DualBeam 3D Wizard are followed to process. The SEM images collected in this embodiment have no distortion, so correction is not required. The following steps are respectively performed in sequence: image cutting, deleting the problematic slices, alignment processing, and then cutting the image again to finally determine the area of interest, filtering, noise reduction, and brightness correction (the two steps of noise reduction and brightness correction are skipped in this embodiment). After completing the steps, threshold segmentation is conducted to perform binarization processing on the overall data. The gray level range corresponding to Laves phase is uniformly defined as 1, and that of the matrix phase is uniformly defined as 0. The selected Laves phase area is displayed in three dimensions. The three basis vector directions of X, Y and Z (Left-hand rule) are defined in Avizo, and observed on the slice. After normalization, X, Y and Z are the basis vectors of three-dimensional images constructed by the SEM image respectively.

4. The orientation information obtained by 3D-EBSD is used to determine the matrix orientation. Since the EBSD image is not corrected with 70 degree during collecting, it needs to be elongated in the vertical direction, and the length after elongation is 2.94 times the original length. The RD, TD and ND directions of the collected EBSD data correspond to the x, y and z basis vector directions of EBSD images respectively, and the x, y and z basis vectors are obtained after normalization.

The geometric relationship in the experiment shows that the relationship between the X, Y and Z basis vector directions defined in Avizo and the x, y and z basis vector directions in EBSD image is:

$X=x; Y=-1*y; Z=z.$

5. The characteristic structure of Laves phase in the embodiment is extracted. The normal orientation of a plane is extracted when the characteristic structure of the plane is extracted. The Slice command of Avizo is used to obtain two surface normals passing through a rod, and the center line direction of the rod is obtained by cross-multiplying the two face normals of two planes. The Slice command of Avizo is used to obtain the face normal of the characteristic plane, and the face normal direction of the plane is the face normal direction of the characteristic plane. The orientation of the characteristic orientation in the crystallographic coordinate system can be obtained by the conversion of X, Y, Z and x, y, z.

At last, it should be stated that the above various embodiments are only used to illustrate the technical solutions of the present disclosure without limitation; and despite reference to the aforementioned embodiments to make a detailed description of the present invention, those ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A method for accurately characterizing a crystal three-dimensional orientation and a crystallographic orientation, comprising the following steps:
    S1 acquiring two-dimensional structure topographies of a series of cross sections in an area to-be-detected of a crystal material;
    S2 acquiring an EBSD pattern in the area to-be-detected;
    S3 using a three-dimensional image analysis software to perform three-dimensional image synthesis on the series of the two-dimensional structure topography acquired in step S1, to acquire a three-dimensional topography;

S4 establishing a conversion relationship between a crystallographic coordinate system acquired by EBSD and a coordinate system of the three-dimensional topography;

S5 extracting a three-dimensional orientation of a characteristic topography in the coordinate system from the three-dimensional topography synthesized in step S3; and S6 converting the three-dimensional orientation of the characteristic topography in step S5 into the crystallographic coordinate system acquired by EBSD, to obtain the crystallographic orientation of the characteristic topography.

2. The method for accurately characterizing a crystal three-dimensional orientation and a crystallographic orientation according to claim 1, wherein the two-dimensional structure topography is obtained by observing through FIB/SEM dual-beam system, or by observing through an optical microscope after mechanical polishing.

3. The method for accurately characterizing a crystal three-dimensional orientation and a crystallographic orientation according to claim 1, wherein the EBSD pattern is obtained by analyzing EBSD data of at least one plane in an area, and the EBSD data is collected based on an EBSD probe.

4. The method for accurately characterizing a crystal three-dimensional orientation and a crystallographic orientation according to claim 1, wherein the characteristic topography can determine the three-dimensional orientation of a characteristic plane through a slicing function in the three-dimensional image analysis software; and for a characteristic line or rod, obtaining the three-dimensional orientation of the characteristic line or rod by extracting normal directions of the two planes passing through the line or rod and carrying out a multiplication cross of the normal directions.

* * * * *